Figure 1:
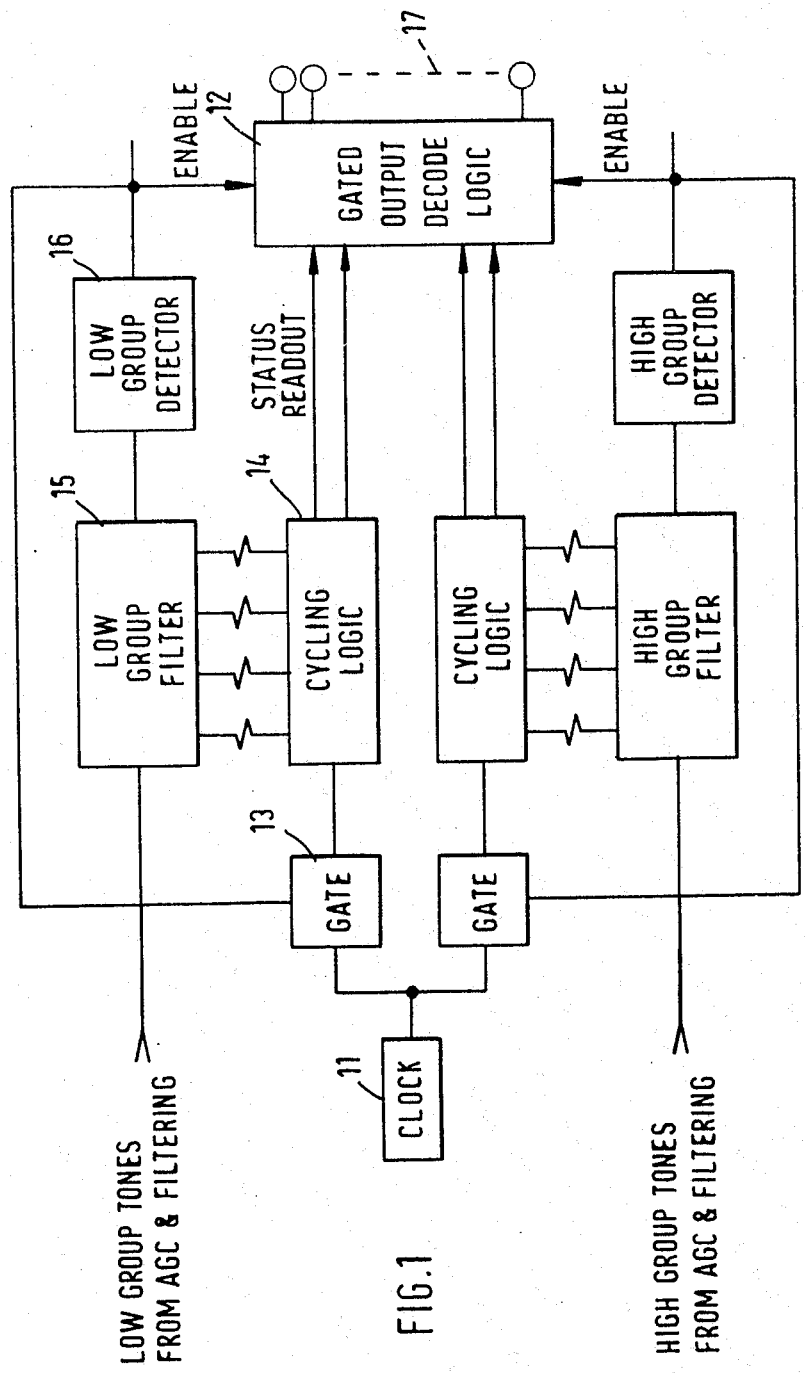

United States Patent [19]
Hamilton

[11] 3,986,112
[45] Oct. 12, 1976

[54] NOVEL TECHNIQUE FOR FREQUENCY DETECTION UTILIZING SWITCHING FILTERS

[76] Inventor: Thomas Allan Hamilton, 222 Newkirk Road, Richmond Hill, Ontario, Canada

[22] Filed: Feb. 19, 1975

[21] Appl. No.: 550,912

[30] Foreign Application Priority Data
Feb. 20, 1974 United Kingdom............... 7760/74

[52] U.S. Cl. .......................... 324/78 R; 324/77 CS; 324/78 Q
[51] Int. Cl.² ...................................... G01R 23/02
[58] Field of Search.............. 324/77 CS, 78 R, 78 F

[56] References Cited
UNITED STATES PATENTS
3,327,210  6/1967  Wu................................. 324/77 CS
3,638,037  1/1972  McMurtrie....................... 324/78 Q Primary Examiner—R. V. Rolinec
Assistant Examiner—Michael J. Tokar
Attorney, Agent, or Firm—William F. Frank

[57] ABSTRACT

A frequency detection device adapted to detect in which of a plurality of frequency bands an input signal occurs comprises band pass filter means for selecting from the input signal the output signals in each of the bands and detecting means responsive to said output signals to stop the scanning action of the scanning means wherein the band pass filter means comprises a band pass filter and means for scanning the filter through different bands in turn, and an indicator actuated by the stopping of the scanning action to indicate the frequency band in which the input signal has occurred.

3 Claims, 5 Drawing Figures

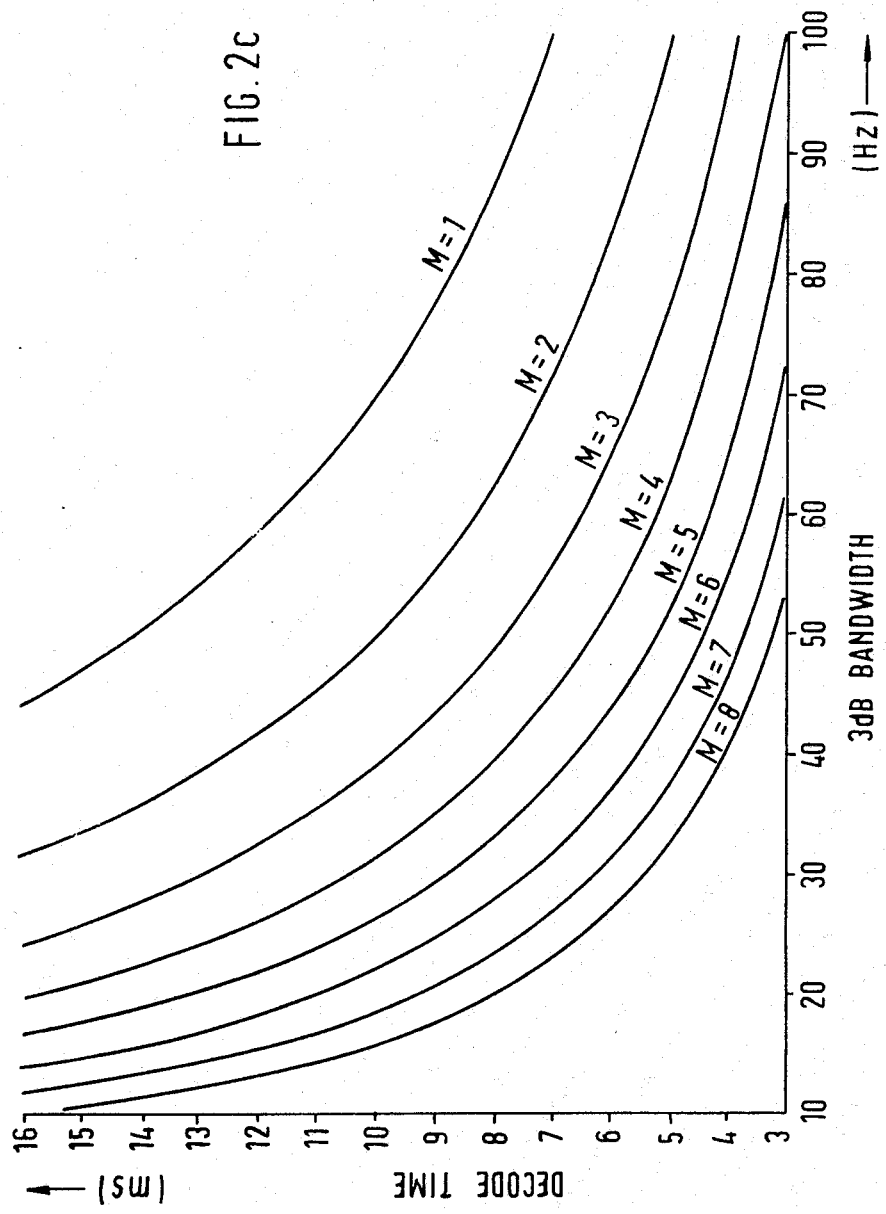

NOVEL TECHNIQUE FOR FREQUENCY DETECTION UTILIZING SWITCHING FILTERS

This invention relates to the detection of different frequency signals.

Digital information can be transmitted in the form of electrical signals of frequencies corresponding to the digits of the information. One such application of this transmission is in push-button "dialling" in a telephone system whereby instead of a given number of pulses being transmitted when a given number is dialled as in the conventional telephone dialling system, a signal having one or more frequencies is generated on actuation of the appropriate push button in order to "dial" that number. At the exchange, it is necessary to detect the frequencies generated at the dialling station. A known detection system for detecting eight possible frequencies utilises eight separate band pass filters followed by eight separate tone detectors. In one known system, each push-button is arranged to generate two of these frequencies, one frequency selected from a group of four high frequencies, and one frequency selected from a group of four low frequencies. The four-fold choice from each group provides 16 possible digits. In the system described above, only two of the eight separate tone detectors will respond to the actuation of any given push-button. The system described so far is known by the term "Touch Tone", which is a Registered Trade Mark of American Telephone and Telegraph Company.

An object of the invention is to provide a frequency detection device which does not require separate tone detectors for detecting each frequency band in a group.

According to the invention there is provided a frequency detection device adapted to detect in which of a plurality of frequency bands an input signal occurs comprising band pass filter means for selecting from the input signal output signals in each of the bands and detecting means responsive to said output signals wherein the band pass filter means comprises a band pass filter and means for scanning the filter through different bands in turn, to select the output signals in each of the bands from the input signal, detecting means responsive to said output signal to stop said scanning means, and an indicator actuated by the stopping of the scanning action to indicate the frequency band in which the input signal has occurred.

Figure 2A:
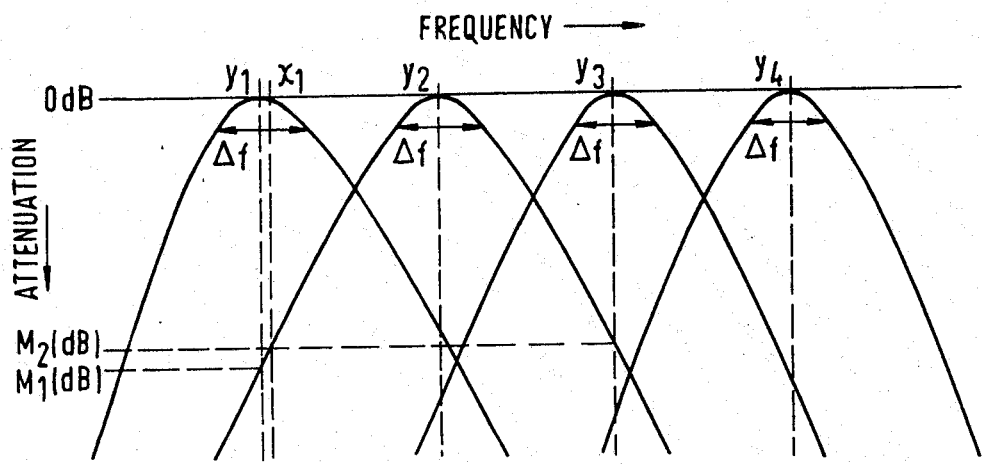
Figure 2B:
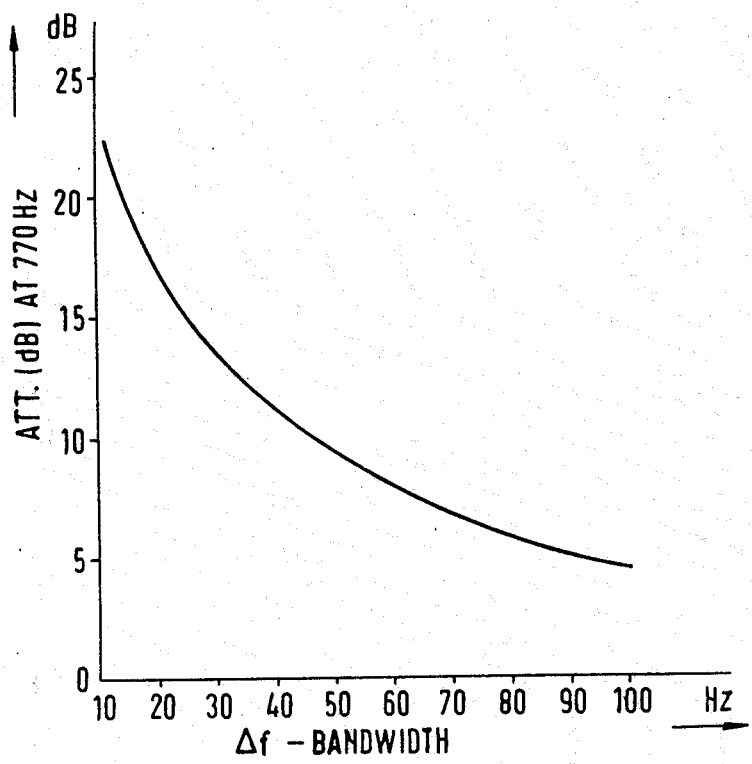
Figure 3:
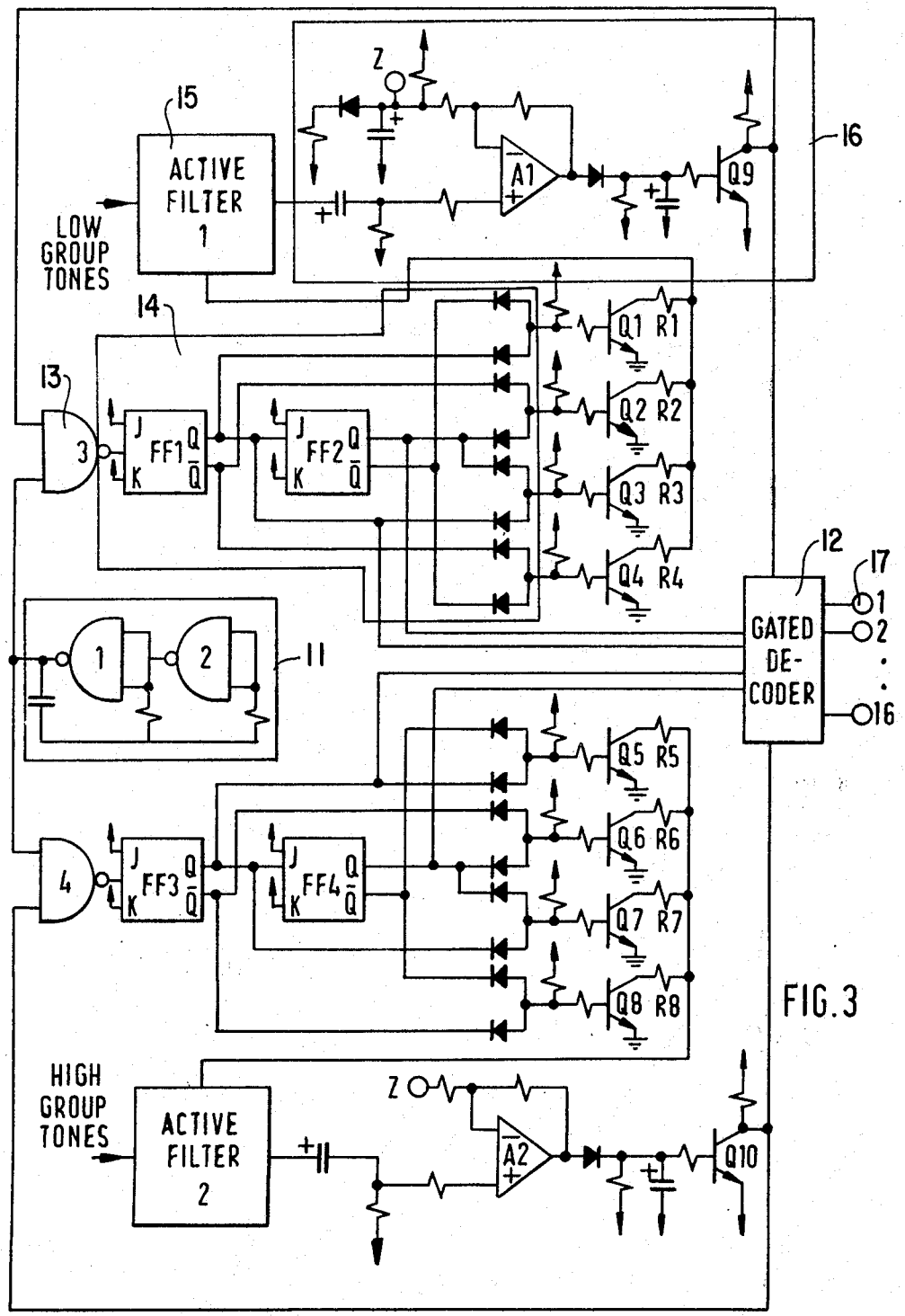

An example of the invention will now be described with reference to the accompanying drawings in which:

FIG. 1, showing a basic block diagram for the frequency decoder,

FIG. 2a showing approximately the frequency response of the four filters of any group of frequencies, FIG. 2b which is a plot of the attenuation at 770 Hertz against bandwidth of a 697 Hertz filter, FIG. 2c which shows a plot of response time of a filter against bandwidth, and FIG. 3 which shows a schematic circuit diagram of the frequency decoder shown in FIG. 1.

The frequency decoder illustrated in FIG. 1 includes a clock signal generator 11 and a gated output decode logic circuit 12 at the input and output of the decoder respectively. Between these two components, there are two groups of components, one group for high frequencies and one group for low frequencies. The layout of components in each group is the same.

The components for the group of low frequencies will now be described. The output from the clock generator 11 is fed through a gate 13 to a cycling logic circuit 14. A single filter 15 for the group of low frequencies is connected to the cycling logic 14, and is switched to different bands in the group of low frequencies according to the state of the cycling logic circuit 14. The filter 15 is supplied with signals from the input to the detector within the group of low frequencies, and a detector 16 is connected to the filter to detect when a frequency within the band to which the filter 15 is switched by the logic 14 occurs in the input signal. The output from the detector 16 is connected to enable the gated output decode logic circuit 12 and to disable the gate 13. Disabling the gate 13 prevents further progression of the cycling logic 14. An output from the cycling logic 14 is connected to the logic circuit 12.

Eventually, the logic circuit 12 will be enabled by the detector 16 from the group of low frequencies and from the group of high frequencies, so that the logic circuit 12 will receive the states of the cycling logic circuits 14 from both groups and will provide an output on the appropriate one of 16 output lines 17 to indicate the digit corresponding to the particular combination of low frequency and high frequency in the input signal applied to the detector.

The input signal for the detector is applied to a high pass filter which rejects the dial tone and other undesirable frequencies below 650 Hz. This signal is then applied to separate low pass and high pass band splitting filters, whose outputs are connected to the inputs of the filters 15 for the group of low and high frequencies respectively. The low pass and high pass band splitting filters include high gain limiting circuits whose outputs are square waves of the same frequencies of the incoming tones but the magnitudes are independent of any variations in the amplitude of the incoming tones. The outputs from the limiter circuits are approximately 1.4 volt peak-to-peak square waves.

The filter 15 can be switched to operate in different frequency bands by connected an appropriate earth resistor to a control input. The switching of appropriate earthed resistors is achieved by the cycling logic circuit 14.

The output of the clock circuit is approximately a square wave of 9 milliseconds time period. When there is no input signal or the tones of the input signal are of the frequencies rejected by the filters 15, the collectors of the transistors Q9 and Q10 (see FIG. 3) are high which enable the low group and high group gates 13. In this state, the clock signal appears at the inputs of the cycling logic circuits 14. This circuit includes a pair of flip-flops connected to apply earth potential in turn to each of the resistors R1 to R4 in the low frequency group and each of the resistors R5 to R8 in turn in the high frequency group. The resistors R1 to R4 are connected to the control input of the filter 15 for the low group of frequencies, and the resistors R5 to R8 to the control input of the corresponding filter for the high group of frequencies.

The flip-flop can be replaced by a dual binary counter whose two outputs are decoded by dual 2 line to four-line decoders, whose outputs correspond to the outputs of the flip-flop circuits. In either case, these outputs sequentially assume the logic 1 state for about 9 milliseconds. This period corresponds to a worst case decode time of about 40 milliseconds, which is comparable to other state-of-the-art decoders and is fast enough for the majority of applications. In the worst case condition for the decoder, the incident tone pair will arrive just as the filter is at the end of its period for looking for one or both of the frequencies. Under these conditions, it must cycle through the other frequencies in the group and then return to the input frequency long enough to be decoded. For the highest speed, this is equivalent to less than five full scan periods, which allows a scan period of about 9 milliseconds for decoding in less than 40 milliseconds.

When the input tone for the low group of frequencies lies within the frequency band to which the filter 15 is switched, the output of the filter 15 goes high which in effect turns on the transistor Q9. The low output of this transistor disables the low frequency group gate 13 so that no more clock pulses are applied to the low group cycling circuit 14 which is now locked to its present state the filter 15 maintains its centre frequency in the locked state. Similarly, the components for the high group of frequencies behave in a similar fashion, although the time of locking may not be coincident with the time for the low group of frequencies.

The collectors of the transistors Q9 and Q10 are connected through a delay circuit (not shown) which applies a delay of about 20 milliseconds to the enabling gate of the gated decoder 12, which circuit decodes the states of the cycling logic circuits 14 for the high and low groups of frequencies, providing a logic 1 on the appropriate output line 17.

The description with respect to FIGS. 1 and 3 has indicated how a single digit is detected. Since the received information will usually consist of more than one digit, it is necessary to store the received digits until all the information is received. When the decoder is used to recognise whether the digits of an incoming signal correspond to the identification code of the station at which the decoder is present, the signals on the output lines 17 are matched to the identification code signal. The output of the delay circuit is used to drive an output sequence detection object circuit (not shown). This circuit compares the first digit received by the decoding circuit with the first digit of the identification code, the second with the second digit and so on. If all the digits correspond to the identification code, the output sequence detection logic will fire, for example to connect the receiving telephone apparatus to the input line to connect the conversation with the dialling station.

The design of the filter 15 and detector 16 for optimum decode time and maximum protection againt false detection is decided as follows in accordance with the following definitions:

Trigger time — this is the time required for the filter output to reach the trigger level of the detector circuit with zero initial condictions with the correct frequency step input.

Protection — (in dB) — This is defined as the ratio in dB between the trigger level of the detector circuitry and the voltage appearing at the filter output due to the closest adjacent tone.

Trigger Level — This is the level in dB below the maximum output of the filter at centre frequency at which the detector circuitry will trigger.

For the initial design, a worst case decode time of 40 msec was chosen. This is comparable to other state-of-the-art decoders and is fast enough for the majority of applications. In the worst case condition for the decoder, the incident tone pair will arrive just as the filter is at the end of its period of looking for one or both of the frequencies. Under these conditions, it must cycle through the other frequencies in the group and then return to the input frequency long enough to be decoded. For highest speed this is equivalent to less than five full scan periods. For decoding in less than 40 msec therefore, 8 msec is the longest scan period permitted. With a 25% safety factor, a 6 msec trigger time for the filters is satisfactory. The following discussion is based on a requirement for 6 msec trigger time with maximum protection.

In order to determined if a trigger time of 6 msec can be achieved with sufficient protection, there will be required explicit expressions for the trigger time of the filter used and for the attenuation exhibited by this filter at its adjacent tone frequencies. To do this, it will be necessary to first analyse the frequency response of the filter in relation to all other touch tone frequencies.

The band pass filer utilized in the TT decoder is a single tuned circuit with centre frequency externally controllable, independent of its 3 dB bandwidth, by a grounded resistor. The transfer function of the filter is of the form $$H(s) = \frac{K \frac{w_o}{Q} s}{s^2 + \frac{w_o}{Q} s + w_o^2} \quad (1)$$

It can be simply shown that the attenuation of this filter at any level can be given by the expression $$K \text{ (dB)} = 20 \log \left[ 1 + \left(\frac{x_k}{\Delta f}\right)^2 \right]^{1/2} \quad (2)$$

where $x_k$ is the filter bandwidth at an attenuation level of K dB and $\Delta f$ is the 3 dB bandwidth.

FIG. (2a) is an approximation to the frequency response of the four filters of any TT group. The centre frequencies have been denoted $Y_1$, $Y_2$, $Y_3$ and $Y_4$ which, in actual practice, are 697, 770, 852 and 941 Hz. for the lower group and 1209, 1336, 1477 and 1633 Hz for the upper group. The 3 dB bandwidth of the filters, $\Delta f$ are assumed equal because as will be seen later that constant bandwidth will give rise to essentially equal trigger times.

Using (2), one can easily derive expressions for the attenuation of any of the four filters at the centre frequencies of the adjacent filters. For example, consider the second filter with centre frequency of $Y_2$. This filter exhibits an attenuation of $M_1$ dB at $Y_3$ and $M_2$ at $Y_1$. From (2) we have $$M_1 = 20 \log \left[ 1 + \left(\frac{y_3 - x_1}{\Delta f}\right)^2 \right]^{1/2}$$

Where $x_1$ is the frequency below $Y_2$ which corresponds to an attenuation of $M_1$ dB
But $$x_1 = \frac{y_2^2}{y_3}$$

therefore $$M_1 = 20 \log \left[ 1 + \left( \frac{y_3^2 - y_2^2}{y_3 \Delta f} \right)^2 \right]^{1/2} \quad (3)$$

similarly $$M_2 = 20 \log \left[ 1 + \left( \frac{y_2^2 - y_1^2}{y_1 \Delta f} \right)^2 \right]^{1/2} \quad (4)$$

By substituting actual TT frequencies in expressions (3) and (4) for any constant bandwidth $\Delta f$, the attenuation offered to adjacent tones by any of the four filters can be found. It can be shown that the 697 Hz filter will exhibit lowest attenuation at 770 Hz in comparison to all other adjacent tone pairs. Therefore, if the detector circuitry is so designed that it will trigger satisfactorily with 770 Hz tone input with some calculated margin, then the margin for any other adjacent tone pair can be shown to be better.

In other words, one should allow sufficient protection between the threshold level of the detector circuitry and the attenuation exhibited by 697 Hz filter at 770 Hz. The graph of FIG. (2b) shows the attentuation in dB of the 697 Hz filter at 770 Hz vs. the bandwidth of the filter. This curve is calculated from (3) with $Y_3 = 770$ Hz and $Y_2 = 697$ Hz.

In addition, it can be easily shown that, M, the ratio in decibels between the voltage delivered to a single tuned filter and the voltage available at the output in time T is given by the following expression:

$$M = 20 \log \left[ \frac{e^{\pi T \Delta f}}{e^{\pi T \Delta f} - 1} \right] \quad (5)$$

Solving this in terms of response time, $$T = \frac{1}{\pi \Delta f} \text{Ln} \left[ \frac{10^{M/20}}{10^{M/20} - 1} \right]$$

FIG. (2c) shows a plot of the response time, T (msec) of the filter vs. the filter bandwidth $\Delta f$ for various values of M, the threshold level of the detector circuitry in decibels.

As can be seen from FIGS. (2b) and (2c), there is no theoretical optimum for bandwidth and threshold level for minimum trigger time and a specified margin. There are however, some engineering constraints. Firstly, very narrow bandwidths are not recommended since the bandpass filters at high Q are difficult to stabilize. In addition, the low threshold levels will increase noise sensitivity. Secondly, the threshold level should not be too close to the maximum filter output since temperature variations of the filter gain will have a more pronounced effect. For these present determinations, in the claims a trigger level $M = 6$ dB was chosen. From FIG. (2c) a 6 msec trigger time corresponds to a 37 Hz bandwidth and results in (from FIG. (2b) a 12 dB attenuation at 770 Hz. This gives a protection level of 6 dB for the worst case tone pair. The experimental results for a practical decoder utilizing these derived characteristics is shown in the next section.

The TT decoder was built in printed circuit form using two identical filters each of 37 Hz, $-3$ dB bandwidth and initial frequencies of 1000 Hz for the lower group and 1800 Hz for the upper group. The four different frequencies in each group were obtained by using four different resistors. The internal clock and other logic used to switch in different resistors were implemented using CMOS devices. Fourth order Chebyshev low pass and high pass filters were used to separate the input tone pair into its low group and high group tones.

The average decode time was found to be 25 msec and decode times of 8 msec were observed consistently. The 8 msec decode time can be easily accounted for by taking about 6 msec for the filter response time and the remaining for the response times of other devices in the system.

In addition, temperature tests were performed on the TT decoder and the results show that it did not either miss or trigger falsely for any given tone pair from $-30°$ C to $+60°$ C with input signal levels from 10 mv (rms) to 2 V (rms).

The total current drain for the decoder was 20 ma at 12 volts in the stand-by mode and increased to about 25 ma when a valid tone pair arrived.

What is claimed is:

1. A frequency detection device adapted to detect in which of a plurality of frequency bands an input signal occurs, comprising a band pass filter, means for scanning the filter through the different bands in turn in order to select from the input signal the output signals in each of the bands, detecting means responsive to said output signals to stop the scanning action of the scanning means, and an indicator actuated only by the stopping of the scanning action to indicate the frequency band in which the input signal has occurred.

2. A device as claimed in claim 1, wherein the scanning means further comprises means for switching the band pass filter in turn from one band to another, the indicator being responsive to the switching state when the switching action has been stopped by said detector.

3. A device as claimed in claim 1 wherein the band pass filter means comprises a band pass filter and scanning means for each of a plurality of groups of frequency bands, the device being adapted to detect the frequencies in an input signal having one frequency in each group of bands.

* * * * *